(12) United States Patent
Varoglu et al.

(10) Patent No.: US 9,311,382 B2
(45) Date of Patent: Apr. 12, 2016

(54) METHOD AND APPARATUS FOR PERSONAL CHARACTERIZATION DATA COLLECTION USING SENSORS

(71) Applicant: Apple Inc., Cupertino, CA (US)

(72) Inventors: Devrim Varoglu, Santa Clara, CA (US); Mohammad Bidabadi, San Francisco, CA (US); Paolo D. Concha, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 301 days.

(21) Appl. No.: 13/715,020

(22) Filed: Dec. 14, 2012

(65) Prior Publication Data

US 2014/0172873 A1 Jun. 19, 2014

(51) Int. Cl.
*G06F 17/30* (2006.01)

(52) U.S. Cl.
CPC ............................. *G06F 17/30595* (2013.01)

(58) Field of Classification Search
CPC .................................................. G06F 17/30595
USPC .......................................... 707/748, 752, 753
See application file for complete search history.

(56) References Cited

U.S. PATENT DOCUMENTS

| 4,618,861 | A | 10/1986 | Gettens | |
|---|---|---|---|---|
| 7,633,076 | B2 * | 12/2009 | Huppi et al. | 250/559.36 |
| 8,840,483 | B1 * | 9/2014 | Steusloff et al. | 473/222 |
| 2004/0030531 | A1 | 2/2004 | Miller et al. | |
| 2006/0183980 | A1 | 8/2006 | Yang | |
| 2007/0075965 | A1 * | 4/2007 | Huppi et al. | 345/156 |
| 2008/0161655 | A1 | 7/2008 | Teller et al. | |
| 2009/0176526 | A1 | 7/2009 | Altman | |
| 2010/0197463 | A1 | 8/2010 | Haughay, Jr. et al. | |
| 2010/0280838 | A1 | 11/2010 | Bosworth et al. | |
| 2011/0046519 | A1 | 2/2011 | Raheman | |

(Continued)

FOREIGN PATENT DOCUMENTS

| WO | 2010/108287 A1 | 9/2010 |
|---|---|---|
| WO | 2013/109499 A1 | 7/2013 |

(Continued)

OTHER PUBLICATIONS

Genevieve N. Healy et al., Sedentary time and cardio-metabolic biomarkers in US adults: NHANES Jun. 2003, Jan. 11, 2011, European Heart Journal—Google, 8 pages.*

(Continued)

*Primary Examiner* — Jean B Fleurantin
(74) *Attorney, Agent, or Firm* — Kilpatrick Townsend & Stockton, LLP

(57) ABSTRACT

A processor-based personal electronic device (such as a smartphone) is programmed to automatically respond to data sent by various sensors from which the user's activity may be inferred. A wireless communication link may be used by the device to obtain data from remote sensors which may be worn by the user. A personal "scorecard" may be generated from the raw data and from data concerning other users. Personal, raw characterization data may be computed into personal statistical data by averaging over time. Then, it may be sent (anonymously) to a server that receives such data from many (or all) users. The server may return personal statistical positioning to enable comparison of the user to other participants. In certain embodiments, the generation of a personal scorecard from the personal position in the group statistics may be performed in the user's device.

26 Claims, 3 Drawing Sheets

(56) References Cited

U.S. PATENT DOCUMENTS

| | | | |
|---|---|---|---|
| 2011/0184247 | A1 | 7/2011 | Contant et al. |
| 2012/0253485 | A1 | 10/2012 | Weast |
| 2012/0259541 | A1 | 10/2012 | Downey et al. |
| 2013/0345978 | A1 | 12/2013 | Lush et al. |
| 2014/0303892 | A1 | 10/2014 | Morlock |

FOREIGN PATENT DOCUMENTS

| | | |
|---|---|---|
| WO | 2013/113036 A | 8/2013 |
| WO | 2013/113036 A1 | 8/2013 |

OTHER PUBLICATIONS

Das, Sajal, K., et al., "Health Monitoring in an Agent-Based Smart Home by Activity Prediction," In Proceedings of the International Conference on Smart Homes and Health Telematics (ICOST), 2004, 12 pages.

"Self-Reported and Accelerometer-Measured Physical Activity: A Comparison in New York City," Epi Research Report, Apr. 2013, New York City Dept. of Health and Mental Hygiene,12 pages.

Loucaides, Constantinos, A., et al., "Differences in physical activity levels between urban and rural school children in Cyprus," Heath Education Research, 2004, vol. 19, No. 2, pp. 138-147.

Frequently Asked Questions, Strava Metro, Jun. 11, 2015, <URL: http://metro.strava.com/faq/>, 4 pages.

Strava Metro Home Page, Jun. 11, 2015, <URL: http://metro.strava.com>, 4 pages.

"Using GPS to measure physical activity levels," Westat, Jun. 10, 2015, <URL: https://www.westat.com/projects/using-gps-measure-physical-activity-levels>, 2 pages.

Yeom, Hye-A, et al., "Adherence to Physical Activity Among Older Adults Using a Geographic Information System: Korean National Health and Nutrition Examinations Survey IV," Asian Nursing Research, Jun. 2011, vol. 5, No. 2, 10 pages.

\* cited by examiner

METHOD AND APPARATUS FOR PERSONAL CHARACTERIZATION DATA COLLECTION USING SENSORS

BACKGROUND OF THE INVENTION

This invention relates to personal electronic devices. More particularly, it relates to characterizing data obtained from various sensors within a smartphone and/or from remote sensors that are in data communication with a smartphone.

A smartphone is a mobile phone built on a mobile operating system and having advanced computing capability and connectivity. The first smartphones combined the functions of a personal digital assistant (PDA) with a mobile phone. Later models added the functionality of portable media players, compact digital cameras, pocket video cameras, and GPS navigation units to form one multi-use device. Many current smartphones also include high-resolution touchscreens for input and web browsers that display standard web pages as well as mobile-optimized sites. High-speed data access may be provided by Wi-Fi and/or Mobile Broadband.

Wi-Fi is a widely-used technology that allows an electronic device to exchange data wirelessly (using radio waves) over a computer network, including high-speed Internet connections. The Wi-Fi Alliance defines Wi-Fi as any "wireless local area network (WLAN) products that are based on the Institute of Electrical and Electronics Engineers' (IEEE) 802.11 standards". However, since most modern WLANs are based on these standards, the term "Wi-Fi" is used in general English as a synonym for "WLAN".

A device that can use Wi-Fi (such as a personal computer, video-game console, smartphone, tablet, or digital audio player) can connect to a network resource such as the Internet via a wireless network access point. Such an access point (or "hotspot") typically has a range of about 65 feet (20 meters) indoors and a greater range outdoors. Hotspot coverage can comprise an area as small as a single room with walls that block radio waves or as large as many square miles—this may be achieved by using multiple overlapping access points.

Mobile broadband is the term used for wireless Internet access through a portable modem, mobile phone, USB wireless modem, or other mobile devices. A smartphone is basically a cellular telephone with built-in applications and Internet access. In addition to digital voice service, current smartphones provide text messaging, e-mail, Web browsing, and video playback and calling. In addition to their built-in functions, smartphones can run myriad free and paid applications, turning the cellphone into a mobile personal computer.

In addition to radio transmitters and receivers for interacting with cellular telecommunications systems, many smartphones have additional sensors that provide input to their various systems. For example, Apple Inc.'s iPhone® 5 smartphone includes at three-axis gyro, an accelerometer, a proximity sensor and an ambient light sensor.

The iPhone display may respond to a number of sensors. A proximity sensor deactivates the display and touchscreen when the device is brought near the face during a call. This is done to save battery power and to prevent inadvertent inputs from contact with the user's face and ears. An ambient light sensor adjusts the display brightness which in turn saves battery power. A 3-axis accelerometer senses the orientation of the phone and changes the screen accordingly, allowing the user to easily switch between portrait and landscape mode. Photo browsing, web browsing, and music playing support both upright and left or right widescreen orientations.

BRIEF SUMMARY OF THE INVENTION

A processor-based personal electronic device (such as a smartphone) is programmed to automatically collect data sent by various sensors from which the user's activity may be inferred. One or more of the sensors may be worn by the user and remote from the device. A wireless communication link may be used by the device to obtain remote sensor data. In certain embodiments, data from on-board sensors in the device—such as motion sensors, location sensors, ambient light sensors, and the like—may also be used to deduce the user's current activity. In yet other embodiments, user data (such as calendar entries) may also be used to characterize the user's activity.

In one particular representative embodiment, automatically-collected user activity data is used to generate an activity "scorecard" for the user which may allow the user to adjust his or her lifestyle or behavior in order to achieve an activity level goal or to detect an activity level trend.

In another particular preferred embodiment, the process may additionally retrieve activity data concerning other persons from a remote server and compare the user's activity level to the mean or median activity level of a group. The group may be defined by any number of criteria—e.g., age, gender, location, activity type, etc.

BRIEF DESCRIPTION OF THE SEVERAL VIEWS OF THE DRAWING(S)

DETAILED DESCRIPTION OF THE INVENTION

Figure 1:
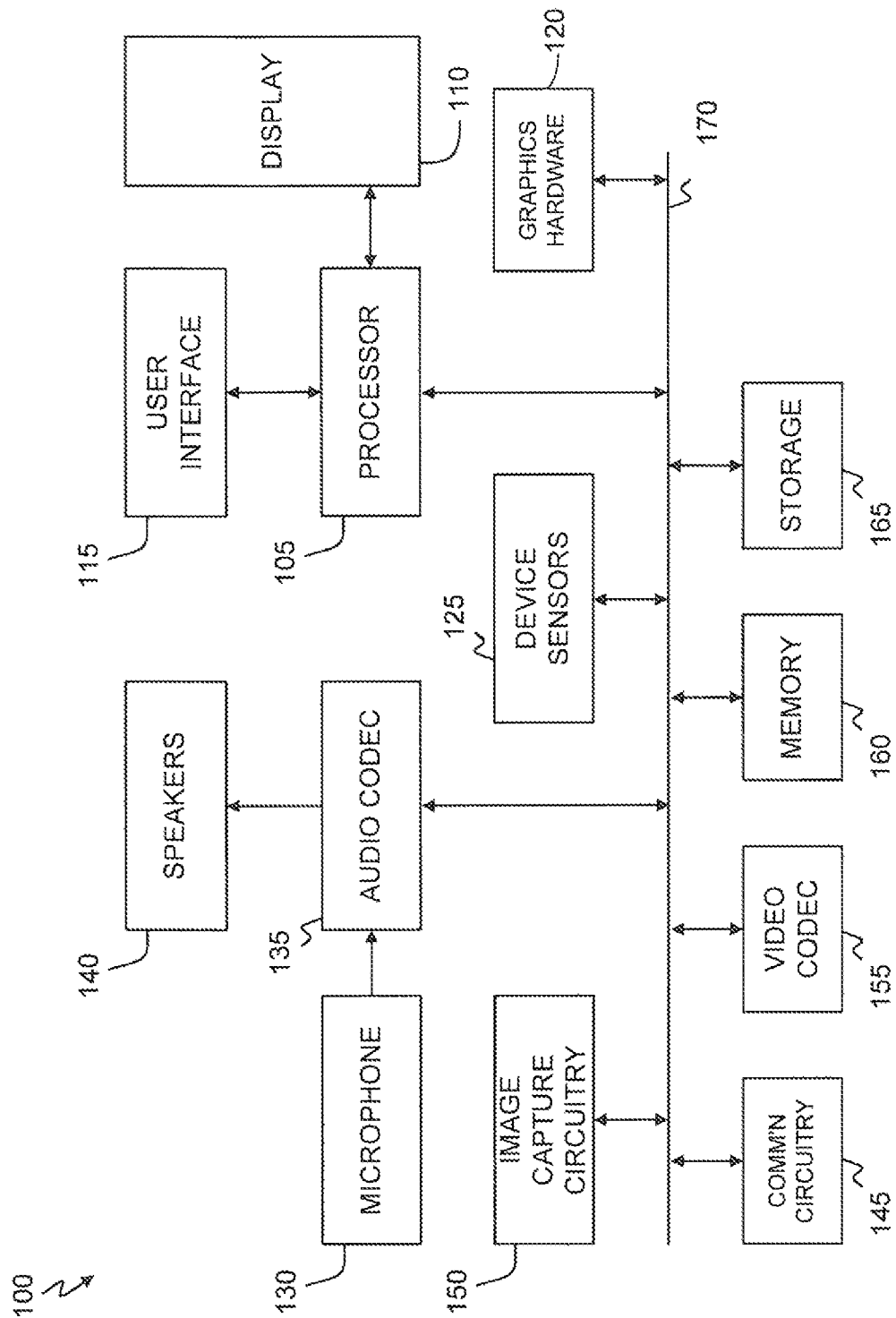
FIG. 1 is a block diagram of a representative processor-based device that may be used to perform the various processes disclosed herein.

Referring to FIG. 1, a simplified functional block diagram of illustrative electronic device 100 is shown according to one embodiment. Electronic device 100 could, for example, be a smartphone, personal media device, portable camera, or a tablet, notebook or desktop computer system. As shown, electronic device 100 may include processor 105, display 110, user interface 115, graphics hardware 120, device sensors 125 (e.g., proximity sensor/ambient light sensor, accelerometer and/or gyroscope), microphone 130, audio codec(s) 135, speaker(s) 140, communications circuitry 145, image capture circuit or unit 150, video codec(s) 155, memory 160, storage 165, and communications bus 170.

Processor 105 may execute instructions necessary to carry out or control the operation of many functions performed by device 100 (e.g., such as the processing of data obtained from device sensors 125). Processor 105 may, for instance, drive display 110 and receive user input from user interface 115. User interface 115 can take a variety of forms, such as a button, keypad, dial, a click wheel, keyboard, display screen and/or a touch screen. Processor 105 may be a system-on-chip such as those found in mobile devices and include one or more dedicated graphics processing units (GPUs). Processor 105 may be based on reduced instruction-set computer (RISC) or complex instruction-set computer (CISC) architectures or any other suitable architecture and may include one or more processing cores. Graphics hardware 120 may be special purpose computational hardware for processing graphics and/or assisting processor 105 perform computational tasks. In one embodiment, graphics hardware 120 may include one or more programmable graphics processing units (GPUs).

Image capture circuitry 150 may capture still and video images that may be processed to generate images. Output from image capture circuitry 150 may be processed, at least in part, by video codec(s) 155 and/or processor 105 and/or graphics hardware 120, and/or a dedicated image processing unit incorporated within circuitry 150. Images so captured may be stored in memory 160 and/or storage 165. Memory 160 may include one or more different types of media used by processor 105, graphics hardware 120, and image capture circuitry 150 to perform device functions. For example, memory 160 may include memory cache, read-only memory (ROM), and/or random access memory (RAM). Storage 165 may store media (e.g., audio, image and video files), computer program instructions or software, preference information, device profile information, and any other suitable data. Storage 165 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 160 and storage 165 may be used to retain computer program instructions or code organized into one or more modules and written in any desired computer programming language. When executed by, for example, processor 105 such computer program code may implement one or more of the methods described herein.

An electronic device such as device 100 may receive inputs from on-board device sensors 125 which sensors may be of the types described, above—e.g., proximity sensors, accelerometers, gyroscopes, ambient light sensors and location sensors. In addition, it may receive signals and/or data from remote sensors via communication circuitry 145. Such remote sensors may be worn by the user of the device—e.g., wrist motion sensors, foot motion sensors, pulse rate sensors, breathing rate sensors, and the like. It will be appreciated by those skilled in the art that processor 105 of system 100 may be programmed to receive input data from the sensors and deduce from that data the current activity of the user. By way of example, motion sensors and pulse rate sensors may indicate that a user is running. However, location sensors may report that the user is not moving and is in a building. From this data, the system may conclude that the user is running on a treadmill. Pattern recognition in sensor data may even be used to determine subtypes within a certain activity type. For example, running on pavement (streets and sidewalks) may be distinguished from running on a trail or from running on a track.

Figure 2:
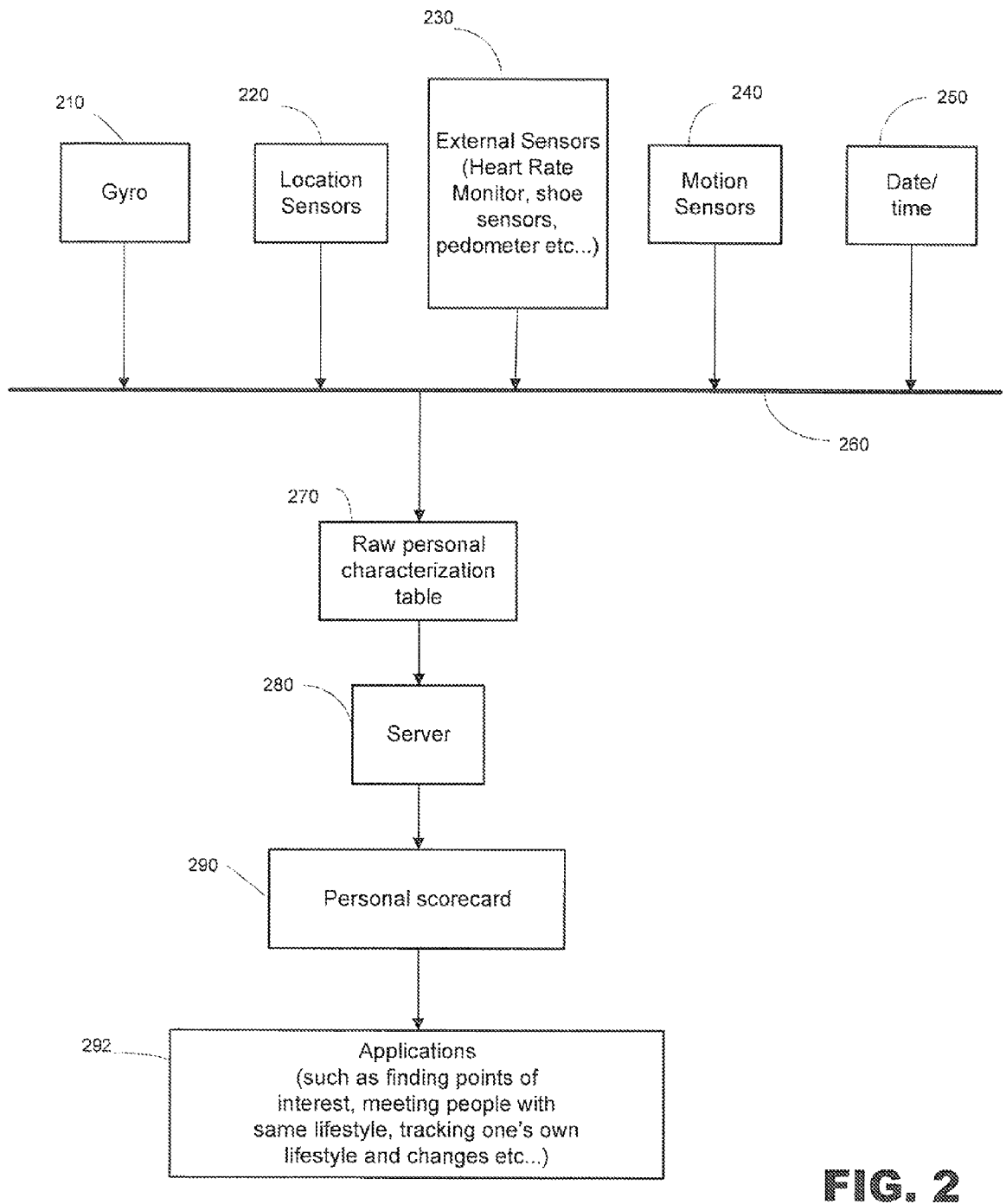
FIG. 2 is a block diagram of a personal characterization data collection process that uses sensors.

FIG. 2 illustrates how personal characterization data derived from sensors may be collected and processed according to certain embodiments. As shown in FIG. 2, various sensors such as orientation sensor 210 (a gyro in the illustrated example), location sensors 220, external sensors 230 that may be worn by the user, motion sensors 240 together with system data 250 (such as date and time) may be connected (directly or via a wireless connection) to a data bus 260 within a device.

The system may automatically generate a personal characterization table 270 from the sensor data which might contain the following representative data:

| Environment | Type | Distance | Duration | Location | Day | Time |
|---|---|---|---|---|---|---|
| Indoor | Bike indoors | 3 miles | 21 mins | Home | Jul. 23, 2012 | 3:00 PM |
| | Run indoors | 2 miles | 32 mins | Work | Jul. 27, 2012 | 2:30 PM |
| | etc . . . | . . . | . . . | . . . | . . . | . . . |
| outdoor | Run outdoors | 4 miles | 56 mins | Mountain | Jul. 31, 2012 | 6:30 AM |
| | Bike indoors | 3 miles | 24 mins | Street | Aug. 03, 2012 | 7:30 AM |
| | etc . . . | . . . | . . . | . . . | . . . | . . . |

The personal electronic device may transmit this information via a data network to a remote server 280 for storage and further processing. Such further processing may include the generation of a personal scorecard 290. User applications 292 may then use the stored activity data and/or scorecard information to perform certain user-selected tasks—e.g., finding points of interest, meeting people with similar lifestyles, tracking one's own lifestyle for changes, etc.

Figure 3:
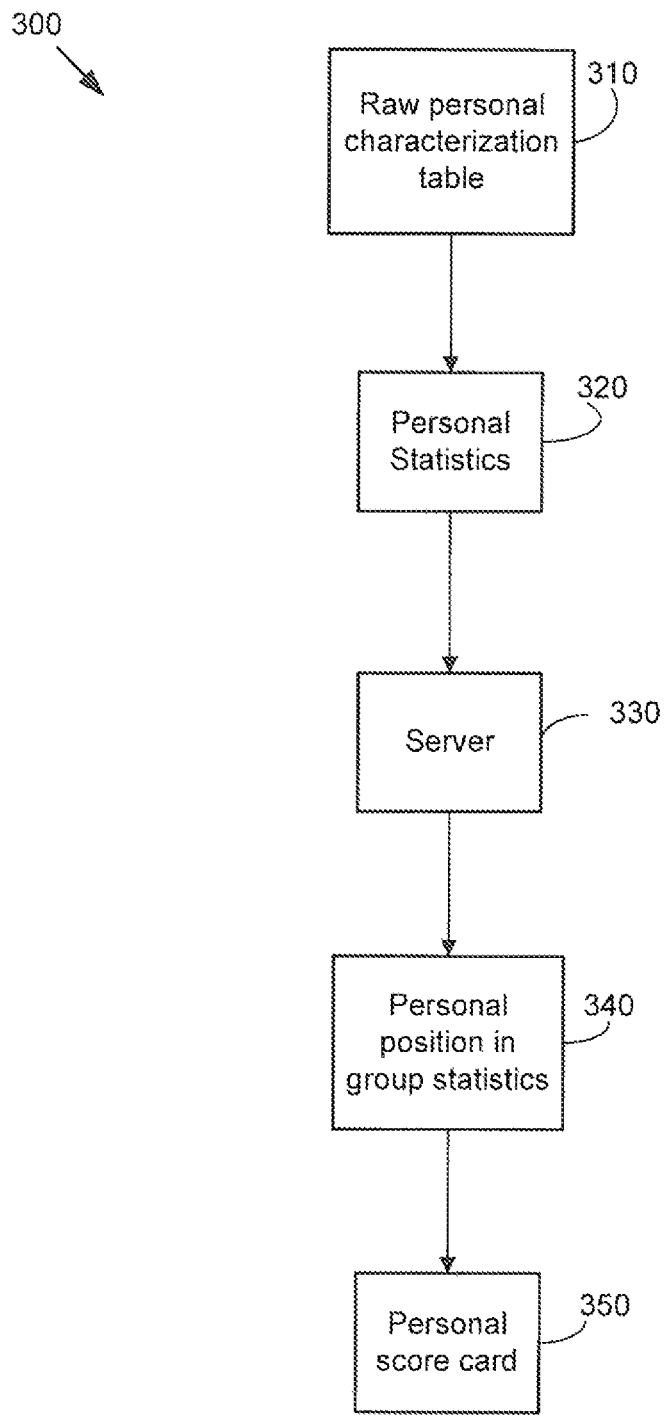
FIG. 3 is flowchart of a process according to one embodiment of the invention for computing a personal scorecard from raw data.

FIG. 3 is a flowchart of a simplified process 300 for computing a personal score card from raw data. Personal, raw characterization data 310 may be computed into personal statistical data 320 by averaging over time. Then, it may be sent (anonymously) to a server 330 that receives such data from many (or all) users. The server may return personal statistical positioning 340 to enable comparison of the user to other participants which may be in the form of a personal scorecard 350. In certain embodiments, the generation of a personal scorecard 350 from the personal position in the group statistics may be performed in the user's device.

The process of computing a personal scorecard from raw data may be further illustrated using the representative data in the following tables:

The user's device may first itemize the raw data:

| Environment | Type | Distance | Duration | Location | Day | Time |
|---|---|---|---|---|---|---|
| Indoor | Bike indoors | 3 miles | 21 mins | Home | Jul. 23, 2012 | 3:00 PM |
| | Run indoors | 2 miles | 32 mins | Work | Jul. 27, 2012 | 2:30 PM |
| | etc . . . | . . . | . . . | . . . | . . . | . . . |
| outdoor | Run outdoors | 4 miles | 56 mins | Mountain | Jul. 31, 2012 | 6:30 AM |
| | Bike outdoors | 3 miles | 24 mins | Street | Aug. 03, 2012 | 7:30 AM |
| | etc . . . | . . . | . . . | . . . | . . . | . . . |

The system may then combine the data (e.g., distance, duration, location, frequency, etc.) to produce monthly statistics for the user:

| Environment | Type | Distance | Duration | Location |
|---|---|---|---|---|
| Indoor | Bike indoors | 35 mi | 200 min | Home |
| | Run indoors | 10 mi | 150 min | Work |
| | etc... | ... | ... | ... |
| outdoor | Run outdoors | 15 mi | 350 min | Mountain |
| | Bike indoors | 30 mi | 250 min | Street |
| | etc... | ... | ... | ... |

Monthly statistics may be combined to produce combined monthly statistics:

| Environment | Distance | Duration | Type | Distance | Duration | X | X | X |
|---|---|---|---|---|---|---|---|---|
| Indoor | 45 | 350 | Bike | 60 mi | 450 min | X | X | X |
| outdoor | 35 | 600 | Run | 25 | 400 | X | X | X |

The combined monthly statistics may be sent to a remote server wherein relative statistical position across the user's region, geographical location, age, etc. may be computed. In certain embodiments, the itemized data and/or the monthly statistical data may also (or alternatively) sent to the server.

From the relative statistical position of the user, scorecards may be generated. Representative examples of scorecards include the following:

| Type | Score |
|---|---|
| Bike indoors | very active |
| Run indoors | active |
| Run outdoors | active |
| Bike indoors | very active |

| Environment | Score | Type | Score |
|---|---|---|---|
| indoors | active | Bike | Very active |
| outdoor | Very active | Run | Very active |

The availability of various sensors in electronic devices such as smartphones, and their ability to wirelessly connect to remote sensors, enables detailed, personalized, activity data collection to occur automatically. For example, using motion sensors (accelerometers), orientation sensors (gyroscopes), and location sensors (Global Navigation Satellite System receivers, Wi-Fi and/or cellular system transceivers) it can be determined where the device user was and what was he or she was likely doing and for how long. For example, a device might determine that at on a certain date, beginning at a certain time, its user was running on a mountain trail in the San Francisco area, for 3 miles which took him or her 50 minutes.

With this information and additional information collected over time, many different statistics may be collected by servers or even locally on the device—for example, the person's interest in outdoor and indoor activities in hours and/or miles for a certain month; the user's biking (indoor/outdoor) activity for a month; etc.

Such activity information may get sent to a remote server where statistics for many users may be available. In certain embodiments, the sensor data itself may be sent to a remote service and the likely user activity computed by the server. Those statistics may be correlated against personal statistics relative to age group, gender; geographic location, and the like. Then, in certain embodiments, "scorecards" may be sent back to the mobile device. In certain embodiments, the detail level and/or features of the scorecard may be selected by the user.

A "scorecard" may include a numeric value related to a user's activity level. In certain embodiments, a scorecard may assign a letter "grade" to a user's activity level. The grade may be related to a certain goal preselected by the user and/or the demographics of the user—e.g., age, gender, location, etc. In yet other embodiments, the "score" may be graphically presented. The graph may depict activity level versus time or date, or versus a selected population of other persons. The scorecard may be specific to one or more selected activities—e.g., cross-country running.

The data from such scorecards may be used in many different applications. Various representative examples are presented, below:

EXAMPLE 1

Scorecard information may be utilized by an Internet search engine to tailor a search to a certain user. For example, if a scorecard indicates that a user often and regularly engages it biking activities, a search by that user for "what to do in Maui" may generate a list of search results wherein "biking from Haleakala" is ranked first rather than fifth (where it might otherwise appear in the absence of such activity interest information).

EXAMPLE 2

A user wishes to meet other people with similar activity interests. Scorecard information for the user may be input to an online dating website which may use that data to refine the match criteria of the user. In this way, potential matches may be limited to persons who regularly participate in the same activities or class of activities. In other embodiments, a potential match may be ranked within a list of matches based at least in part on the person's activity scorecard. In other embodiments, a user may wish to find a person of similar abilities in a particular activity—e.g., a running partner with similar distance runs and similar pace. Potential matches may be made by the system using scorecard data of the user and others in a database based at least in part on performance metrics in a certain activity.

EXAMPLE 3

A user wishes to monitor his or her lifestyle in order to ensure that a desired "balance" is maintained. The system may monitor the user's activity level over time and automatic suggestions may be generated and sent or displayed to the user if his or her lifestyle is trending in the "wrong" direction. In this way, a user might receive a reminder to schedule a certain activity if a previously regular activity is becoming less frequent. In certain embodiments, the expected activity level may be seasonally adjusted and/or location-dependent—e.g., outdoor biking activity may be projected to be less in winter months in certain locales.

EXAMPLE 4

In certain athletic contests, participants are seeded or handicapped by their prior performances in similar contests.

For example, elite runners are often grouped near the starting line of a marathon race in order to avoid interference from less advanced runners. Likewise, difficult mountain biking courses may be open only to experienced riders. An automatically-generated scorecard according to one embodiment may be used as an objective, quantified assessment of a participant's skill level and used to handicap, position or group the participant prior to the beginning of a contest.

EXAMPLE 5

A user of an electronic device wishes to identify potential participants in a car pool. In one embodiment, the device may sort persons in a database which contains data concerning automatically generated reports of driving patterns to identify persons who travel a similar route at similar times. The user's device may automatically record the driving activity of the user including repetitive routes on certain days and times and use that data to identify other persons with similar habits.

EXAMPLE 6

A user wishes to meet others for social interaction. In one embodiment, automatically generated activity scorecard data may be used to characterize a user as a "night owl" or a "morning person"; a "homebody" or a "party person"; an outdoorsman; a marathon runner, etc. Such data may be used by systems which attempt to match persons having similar interests and lifestyles. In certain embodiments, whether to share or not share data may be a user option. In yet other embodiments, the user may elect to share (report) activity data (with non-identifying information) and decline to share personal data (e.g., age, gender, etc.).

EXAMPLE 7

A user has moved to (or is visiting) a new city and wishes to find a running course, hiking path, biking trail, etc. In one embodiment, the user may access a database of automatically generated and reported activity data (scorecards) and sort it for a certain location or specified area (e.g., within a certain radius of the user's current location) and activity. In certain embodiments, the database may be stored and maintained on a remote system that is in data communication with the user's device.

EXAMPLE 8

As in the preceding example, a user wishes to find a running course but also wishes to obtain information concerning the difficulty level of that running course. In one embodiment, the system may determine the elevation changes along a certain route from previous, automatically determined and reported runs by others as determined by GPS-derived location information correlated to stored topographical map data. In other embodiments, the altitude of a device may be obtained from atmospheric pressure sensors and/or GPS information. In this way, the "hilliness" of a certain course may be automatically quantified and presented to the user. In certain embodiments, the database may be stored and maintained on a remote system that is in data communication with the user's device. The correlation between location and elevation may also be performed on a remote system.

EXAMPLE 9

A user (who may be a government official, insurance actuary, highway safety researcher or the like) wishes to know the average speed versus driver age for a particular route or highway segment. In one particular embodiment, a database of automatically obtained and reported user activity may be sorted by location, average speed and self-reported driver age. The database may be on a server that receives and analyzes automatically generated and reported activity data from a large number of device users. In certain embodiments, the user's activity may be determined on the user's device from sensor data obtained by the device. In other embodiments, raw sensor data obtained by the user's device may be transmitted to the server for analysis to determine a likely activity. In this way, greater processing power may be employed to analyze sensor data.

EXAMPLE 10

A user is considering relocating and has a particular interest in cities where year-round outdoor activities are popular. In one particular embodiment, the system may maintain a database of automatically generated and reported user activities which can be accessed and sorted by location, date, activity and number of participants to provide the user with the needed information. Because such automatically generated and reported user activity data is objective, it may be more reliable than the opinions expressed in published guides, blogs, marketing materials and the like.

EXAMPLE 11

As in the preceding example, a user wishes to assess whether the residents of a certain city have an "active lifestyle." In one embodiment, the system may maintain a database of automatically generated and reported user activities from which user "scorecards" are generated that contain a quantitative measure of user activity. A database report may be obtained which presents the average activity level of a particular city's residents versus a national, regional or worldwide average. This may be in the form of a numeric or graphical presentation.

EXAMPLE 12

A user wishes to monitor trends in his or her fitness level. In one embodiment, automatically generated and reported sensor data for a particular running course are automatically compared for increasing or decreasing time to completion, and increasing or decreasing average pulse rate. From this data, certain trends may be identified and reported to the user. In certain embodiments, the data analysis is performed on and reports are generated by the user's device. In other embodiments, user data is automatically sent by the user's device to a remote system that is in data communications with the user's device for analysis and trend identification.

Although particular embodiments of the present invention have been shown and described, they are not intended to limit what this patent covers. One skilled in the art will understand that various changes and modifications may be made without departing from the scope of the present invention as literally and equivalently covered by the following claims.

What is claimed is:

1. A non-transitory program storage device comprising instructions stored thereon to cause one or more processors to:
   obtain, at an electronic device, sensor data from a plurality of sensors including at least a motion sensor;
   determine, at the electronic device, a fitness activity of a user based at least in part on the sensor data;

generate, at the electronic device, statistical data for the user, the statistical data for the user incorporating data representing performance of the fitness activity by the user;

transmit, by the electronic device, the statistical data for the user to a server via a network;

obtain, by the electronic device, a scorecard for the user from the server via the network, wherein the scorecard includes one or more scores for the user, at least one of the scores being based in part on the statistical data for the user and in part on additional statistical data received at the server from one or more other electronic devices, the additional statistical data representing performance of the fitness activity by one or more persons other than the user; and, provide information, at the electronic device, to the user based, at least in part, on the scorecard for the user.

2. A non-transitory program storage device as recited in claim 1 wherein the instructions to provide information comprise instructions to display a graphical representation of one or more of the scores.

3. A non-transitory program storage device as recited in claim 1 wherein the instructions to provide information comprise instructions to display a numeric value related to one or more of the scores.

4. A non-transitory program storage device as recited in claim 3 wherein the displayed numeric value is a percentile.

5. A non-transitory program storage device as recited in claim 1 wherein the instructions to obtain sensor data comprise instructions to obtain two or more of:

sensor data corresponding to motion of a device;
sensor data corresponding to location information of the device;
sensor data corresponding to the person's heart rate;
data corresponding to time;
data corresponding to date; or
data corresponding to personal identifying information of the person.

6. A non-transitory program storage device as recited in claim 1 wherein the sensor data comprises location sensor data and motion sensor data.

7. A non-transitory program storage device as recited in claim 1 wherein the sensor data comprises data from a remote sensor worn by the user.

8. A non-transitory program storage device as recited in claim 7 wherein the remote sensor is in wireless data communication with the electronic device.

9. A non-transitory program storage device as recited in claim 1 wherein the fitness activity comprises one or more of:
walking;
running; or
bicycling.

10. A non-transitory program storage device as recited in claim 1 wherein at least one of the scores is based on computing a first average value from the statistical data for the user over a period of time encompassing multiple instances of performing the fitness activity and comparing the first average value to a second average value computed by the server from the additional statistical data.

11. A non-transitory program storage device as recited in claim 1 further comprising instructions for causing a processor to retain at least some of the sensor data in a memory.

12. A non-transitory program storage device as recited in claim 11 further comprising instructions for causing a processor to generate statistics based, at least in part, on some of the retained sensor data; and,
retain the statistics in the memory.

13. A non-transitory program storage device as recited in claim 1 wherein the one or more persons other the user include one or more persons in one or more remote locations.

14. A non-transitory program storage device as recited in claim 13 wherein the instructions to provide information to the user comprise instructions to:

assign an order to the user and at least one of the one or more other persons in accordance with a specified manner; and display information about the one or more scores for the user based, at least in part, on the assigned order.

15. A non-transitory program storage device as recited in claim 1 further comprising instructions to publish, via the electronic device, information corresponding to the fitness activity of the user through a social media service.

16. A non-transitory program storage device as recited in claim 1 wherein the scorecard includes separately determined scores for each of a plurality of fitness activities engaged in by the user.

17. A non-transitory program storage device as recited in claim 16 wherein the scorecard includes separately determined scores for indoor and outdoor fitness activities engaged in by the user.

18. A non-transitory program storage device as recited in claim 16 wherein the score for each of the fitness activities is based on a statistical position of the user relative to the one or more other persons with regard to that fitness activity.

19. A non-transitory program storage device as recited in claim 1 wherein the instructions to generate statistical data for the user include instructions to:

generate activity characterization data each time the user performs the fitness activity, the activity characterization data including a distance and a duration of the fitness activity; and compute the statistical data based on aggregating the activity characterization data across a preselected time period in which the user performs the fitness activity one or more times.

20. A processor-based system comprising:
at least one processor;
at least one sensor responsive to the activity of a user and in data communication with the at least one processor; and,
a memory storing instructions for causing the at least one processor to:
obtain sensor data from the at least one sensor;
determine a fitness activity of a user based at least in part on the sensor data;
generate statistical data for the user, the statistical data for the user incorporating data representing performance of the fitness activity by the user;
transmit to a server, via a network, the statistical data for the user;
obtain from the server, via the network, a scorecard for the user, wherein the scorecard includes one or more scores for the user, at least one of the scores being based in part on the statistical data for the user and in part on additional statistical data received at the server from one or more other electronic devices, the additional statistical data representing performance of the fitness activity by one or more persons other than the user; and
provide information to the user based, at least in part, on the scorecard for the user.

21. A processor-based system as recited in claim 20 wherein the instructions to obtain sensor data comprise instructions to obtaining two or more of:

sensor data corresponding to motion of a device;
sensor data corresponding to location information of the device;
sensor data corresponding to the person's heart rate;
data corresponding to time;
data corresponding to date; or
data corresponding to personal identifying information of the person.

22. A processor-based system as recited in claim 20 wherein the sensor data comprises data from a remote sensor worn by the user.

23. A processor-based system as recited in claim 22 wherein the remote sensor is in wireless data communication with the electronic device.

24. A processor-based system as recited in claim 20 wherein at least one of the scores is based on computing a first average value from the statistical data for the user over a period of time encompassing multiple instances of performing the fitness activity and comparing the first average value to a second average value computed by the server from the additional statistical data.

25. A processor-based system as recited in claim 20 further comprising instructions for causing a processor to retain at least some of the sensor data in a memory.

26. A processor-based system as recited in claim 20 wherein the instructions to provide information to the person comprise instructions to:
   assign an order to the user and at least one of the one or more other persons in accordance with a specified manner; and
   display information about the one or more scores for the user based, at least in part, on the assigned order.

* * * * *